(12) United States Patent
Zhang et al.

(10) Patent No.: US 12,439,428 B2
(45) Date of Patent: Oct. 7, 2025

(54) METHODS AND APPARATUS FOR PDCCH MONITORING

(71) Applicant: LENOVO (BEIJING) LIMITED, Beijing (CN)

(72) Inventors: Yuantao Zhang, Dongcheng District (CN); Zhi Yan, Xicheng District (CN); Hongmei Liu, Changping District (CN); Yingying Li, Haidian District (CN); Haiming Wang, Xicheng District (CN)

(73) Assignee: LENOVO (BEIJING) LIMITED, Beijing (CN)

(*) Notice: Subject to any disclaimer, the term of this patent is extended or adjusted under 35 U.S.C. 154(b) by 390 days.

(21) Appl. No.: 18/006,460

(22) PCT Filed: Jul. 30, 2020

(86) PCT No.: PCT/CN2020/105730
§ 371 (c)(1),
(2) Date: Jan. 23, 2023

(87) PCT Pub. No.: WO2022/021192
PCT Pub. Date: Feb. 3, 2022

(65) Prior Publication Data
US 2023/0269750 A1 Aug. 24, 2023

(51) Int. Cl.
*H04W 72/232* (2023.01)
*H04L 5/00* (2006.01)

(52) U.S. Cl.
CPC ......... *H04W 72/232* (2023.01); *H04L 5/0023* (2013.01)

(58) Field of Classification Search
CPC .......................... H04W 72/232; H04L 5/0023
USPC .......................................................... 370/277
See application file for complete search history.

(56) References Cited

U.S. PATENT DOCUMENTS

| | | | |
|---|---|---|---|
| 9,544,887 B2* | 1/2017 | Kim | H04L 5/0048 |
| 2015/0016408 A1* | 1/2015 | Yang | H04L 27/2692 370/329 |
| 2019/0222391 A1* | 7/2019 | Lee | H04L 1/0038 |
| 2019/0349911 A1 | 11/2019 | Seo et al. | |

(Continued)

FOREIGN PATENT DOCUMENTS

| | | |
|---|---|---|
| EP | 3629645 A1 | 4/2020 |
| WO | 2018204886 A1 | 11/2018 |

OTHER PUBLICATIONS

PCT/CN2020/105730, "International Preliminary Report on Patentability", PCT Application No. PCT/CN2020/105730, Feb. 9, 2023, 5 pages.

(Continued)

*Primary Examiner* — Peter G Solinsky
(74) *Attorney, Agent, or Firm* — FIG. 1 Patents

(57) ABSTRACT

Embodiments of the present disclosure relate to methods and apparatuses for physical downlink control channel (PDCCH) monitoring. According to an embodiment of the present disclosure, a method may include: receiving first configuration information indicating that at least two search space sets are associated; and detecting downlink control information (DCI) in the at least two search space sets based on the first configuration information.

20 Claims, 4 Drawing Sheets

(56) References Cited

U.S. PATENT DOCUMENTS

2020/0052846 A1\* 2/2020 Takeda ................. H04L 5/0048
2020/0314898 A1\* 10/2020 Sun ................... H04W 72/0446

OTHER PUBLICATIONS

PCT/CN2020/105730 , "International Search Report and Written Opinion", PCT Application No. PCT/CN2020/105730, Apr. 27, 2021, 6 pages.

\* cited by examiner

METHODS AND APPARATUS FOR PDCCH MONITORING

TECHNICAL FIELD

Embodiments of the present disclosure are related to wireless communication technologies, and more particularly, related to methods and apparatuses for physical downlink control channel (PDCCH) monitoring.

BACKGROUND

In some 3rd Generation Partnership Project (3GPP) new radio (NR) scenarios, a reduced capability (RedCap) user equipment (UE) is introduced. The RedCap UE has lower end capabilities, relative to enhanced mobile broadband (eMBB) or ultra reliable low latency communications (URLLC) UEs, to serve use cases such as industrial wireless sensors, video surveillances and wearables. For example, the RedCap UE may have a reduced number of receiving or transmitting antennas, a reduced bandwidth, a relaxed processing time, or a relaxed processing capability, or operate in a half-duplex frequency division duplex (FDD) mode.

Compared with eMBB and URLLC UEs, RedCap UEs may require lower data rates, lower reliability requirements, and a longer battery life. One possible way to achieve a longer battery life for a UE is to reduce PDCCH monitoring. Thus, it is needed to develop a technology for reducing PDCCH monitoring for UEs, especially for RedCap UEs.

SUMMARY OF THE DISCLOSURE

Embodiments of the present disclosure at least provide a technical solution for PDCCH monitoring.

According to an embodiment of the present disclosure, a method may include: receiving first configuration information indicating that at least two search space sets are associated; and detecting downlink control information (DCI) in the at least two search space sets based on the first configuration information.

According to another embodiment of the present disclosure, a method may include: transmitting first configuration information indicating that at least two search space sets are associated; and transmitting DCI in the at least two search space sets based on the first configuration information.

According to yet another embodiment of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least processor to implement a method according to any embodiment of the present disclosure.

Embodiments of the present disclosure can reduce PDCCH monitoring by associating search space sets, and meanwhile ensure a low PDCCH blocking rate.

BRIEF DESCRIPTION OF THE DRAWINGS

In order to describe the manner in which advantages and features of the present disclosure can be obtained, a description of the present disclosure is rendered by reference to specific embodiments thereof, which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

Figure 1:
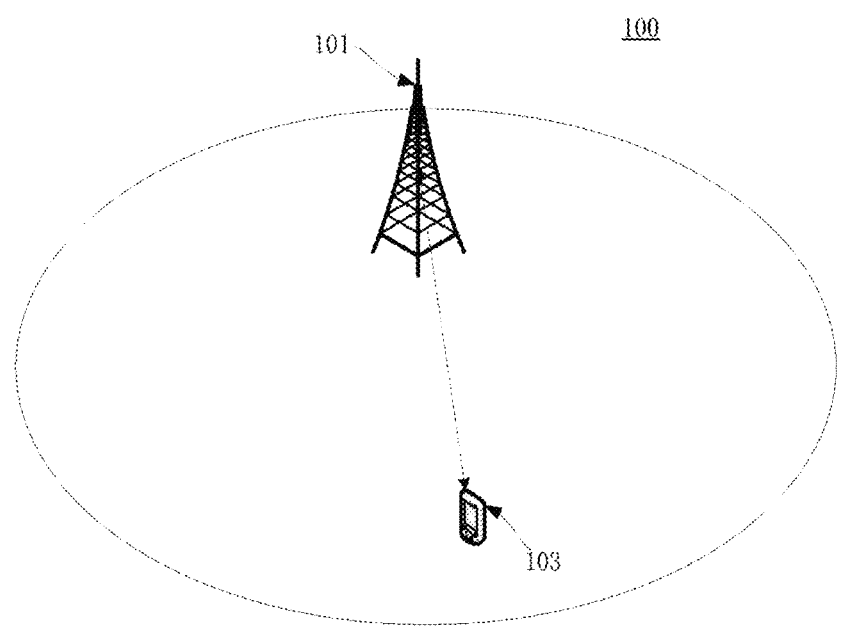
FIG. 1 illustrates a schematic diagram of an exemplary wireless communication system according to some embodiments of the present disclosure.

FIG. 1 illustrates a schematic diagram of an exemplary wireless communication system 100 according to some embodiments of the present disclosure.

As shown in FIG. 1, the wireless communication system 100 can include at least one base station (BS) 101 and at least one UE 103. Although a specific number of BSs 101 and UEs 103, e.g., only one BS 101 and one UE 103, are depicted in FIG. 1, one skilled in the art will recognize that any number of BSs 101 and UEs 103 may be included in the wireless communication system 100.

The BS 101 may be distributed over a geographic region, and generally be a part of a radio access network that may include one or more controllers communicably coupled to one or more corresponding BSs 101. In some embodiments of the present disclosure, each BS 101 may also be referred to as an access point, an access terminal, a base, a macro cell, a Node-B, an evolved Node B (eNB), a gNB, a Home Node-B, a relay node, a device, or described using other terminology used in the art.

According to some embodiments of the present disclosure, the UE 103 may be a computing device, such as a desktop computer, a laptop computer, a personal digital assistant (PDA), a tablet computer, a smart television (e.g., a television connected to the Internet), a set-top box, a game console, a security system (including a security camera), a vehicle on-board computer, a network device (e.g., a router, a switch, or a modem), or the like. According to some other embodiments of the present disclosure, the UE 103 may be a portable wireless communication device, a smart phone, a cellular telephone, a flip phone, a device having a subscriber identity module, a personal computer, a selective call receiver, or any other device that is capable of sending and receiving communication signals on a wireless network. According to some other embodiments of the present disclosure, the UE 103 may be a RedCap UE.

In addition, the UE 103 may also be referred to as a subscriber unit, a mobile, a mobile station, a user, a terminal, a mobile terminal, a wireless terminal, a fixed terminal, a subscriber station, a user terminal, or a device, or described using other terminology used in the art.

The BS 101 may transmit a PDCCH carrying downlink control information (DCI) to the UE 103. The UE 103 may detect the PDCCH or DCI from one or more configured search space sets. A search space set is associated with a control resource set (CORESET), which defines physical resources from which the search space set is defined. A CORESET consists of a set of control channel elements (CCEs), and each CCE corresponds to 6 resource blocks (RBs) within the CORESET. From BS point of view, multiple CCEs can be aggregated to transmit a DCI, and the number of CCEs used for a DCI transmission is called a CCE aggregation level.

The UE 103 may be configured with one or more search space sets. Each search space set may be configured with one or more CCE aggregation levels. Each CCE aggregation level further corresponds to a set of candidate control channels (also referred to as "candidates" herein). Typically, the UE 103 needs to blind detect each candidate control channel for each CCE aggregation level configured for each configured search space set to determine whether a DCI is transmitted for the UE 103. Therefore, the more candidate control channels the UE 103 is configured with, the more power the UE 103 will consume when performing PDCCH monitoring. On the other hand, the UE 103 shall be configured with an enough number of candidate control channels, otherwise the PDCCH transmitted for other UE(s) may block the PDCCH transmission for the UE 103 (i.e., all the candidate control channels of the UE 103 may have been occupied by PDCCH transmissions of other UE(s)) with higher probability. Therefore, there is a trade-off between the PDCCH monitoring effort and the PDCCH blocking rate. It is always desirable that the UE 103 could have a low power consumption by detecting a low number of candidate control channels while there is a low PDCCH blocking rate for the UE 103.

For a search space set with a search space identifier (ID) s associated with a CORESET with a CORESET ID p, the CCE indexes for an aggregation level L corresponding to a candidate control channel with an index $m_{s,n_{CI}}$ of the search space set in a slot numbered as $n_{s,f}^{\mu}$ for an active downlink bandwidth part of a serving cell corresponding to a carrier indicator field value $n_{CI}$ may be given by the following formula (1):

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad (1)$$

Where
for a UE specific search space set, $Y_{p,n_{s,f}^{\mu}} = (A_p * Y_{p,n_{s,f}^{\mu}-1})$ mod D, $Y_{p,-1} = n_{RNTI} \neq 0$, $A_p = 39827$ for p mod 3=0, $A_p = 39829$ for p mod 3=1, $A_p = 39839$ for p mod 3=2, and D=65537;

i=0, ..., L−1;

$N_{CCE,p}$ is the number of CCEs, which are numbered from 0 to $N_{CCE,p}-1$, in the CORESET p;

$m_{s,n_{CI}} = 0, \ldots, M_{s,max}^{(L)}-1$, where $M_{s,max}^{(L)}$ is the number of candidate control channels configured for the UE to monitor for the aggregation level L of the search space set s for a serving cell corresponding to $n_{CI}$; and $n_{RNTI}$ is a radio network temporary identity (RNTI) value for the UE, e.g., the cell-RNTI (C-RNTI).

To reduce the PDCCH monitoring effort and meanwhile enable a low PDCCH blocking rate, embodiments of the present disclosure provide a solution by associating search space sets.

According to some embodiments of the present disclosure, two or more search space sets of a UE may be configured to be associated. In an embodiment, the associated search space sets may include at least one common search space set, and at least one UE specific search space set. In another embodiment, the associated search space sets may only include UE specific search space sets. The configuration information indicating that the two or more search space sets are associated may be transmitted to the UE through at least one UE specific signaling, e.g., radio resource control (RRC) signaling, medium access control (MAC) signaling, physical layer (PHY) signaling, or any combination thereof. In another embodiment, two or more search space sets of a UE are associated through an implicit way. As an example, a search space set configured with a downlink DCI format is associated with a search space set configured with an uplink DCI format. As another example, a search space set configured with non-fallback DCI (e.g., DCI format 1-1 and DCI format 0-1) is associated with a search space set configured with fallback DCI (e.g., DCI format 1-0 and DCI format 0-0).

In some embodiments of the present disclosure, the associated search space sets are defined in the same physical resources. For example, the associated search space sets are associated with a same CORESET and configured with a same starting symbol in time domain (e.g., they are configured with the same set of orthogonal frequency division multiplexing (OFDM) symbols in a slot). In other embodiments of the present disclosure, the associated search space sets are defined in different physical resources. For example, the associated search space sets are associated with different CORESETs, or associated with the same CORESET but configured with different starting symbols in time domain.

Each of the associated search space sets may be numbered with a relative index. In an embodiment of the present disclosure, the relative index of a search space set can be determined based on the search space ID of the search space set. For example, in a case that two search space sets with search space IDs $k_0$ and $k_1$, respectively, are configured to be associated, and $k_0 < k_1$, the relative index of search space set $k_0$ would be 0, and the relative index of search space set $k_1$ would be 1. It should be understood that the relative indexes of the associated search space sets can be implicitly obtained by the UE, and the BS does not need to explicitly signal the relative indexes of the associated search space sets to the UE. In another embodiment, each of the associated search space sets is configured with a relative index.

According to some embodiments of the present disclosure, for the associated search space sets which are defined in the same physical resources, for each specific CCE aggregation level, the candidates in the associated search space sets are numbered jointly and sequentially according to the relative index of the search space sets. Consequently, each candidate is numbered with a relative index as well.

As an example, supposing that n search space sets are defined in the same physical resources and configured to be associated, and for a specific CCE aggregation level L, the number of candidates in search space set $k_i$ is i=0, 1, ..., n−1, the relative indexes of the candidates in the associated search space sets would be:

For search space set $k_0$ with relative index 0, the relative indexes of the $m_0$ candidates would be 0*0, 0*0+1, ..., 0*0+$m_0$−1;

For search space set $k_1$ with relative index 1, the relative indexes of the $m_1$ candidates would be 1*$m_0$+0, 1*$m_0$+1, ..., 1*$m_0$+$m_1$−1;

...

For search space set $k_{n-1}$ with relative index n−1, the relative indexes of the $m_{n-1}$ candidates would be (n−1)*($m_0$+$m_1$+ ... +$m_{n-2}$)+0, (n−1)*($m_0$+$m_1$+ ... +$m_{n-2}$)+1, ..., (n−1)*($m_0$+$m_1$+ ... +$m_{n-2}$)+$m_{n-1}$−1.

The CCE indexes for each candidate for a CCE aggregation level L in each search space set of the associated search space sets can be determined by the following formula (2):

$$L \cdot \left\{ \left( Y_{p,n'_{s,f}}^{\mu} + \left\lfloor \frac{m_{s,n'_{CI}} \cdot N_{CCE,p}}{L \cdot M_{s,max}^{(L)\prime}} \right\rfloor + n_{CI} \right) \bmod \lfloor N_{CCE,p}/L \rfloor \right\} + i \quad (2)$$

Formula (2) is different from formula (1) in the following two parameters:

The index of the candidate $m'_{s,n_{CI}}$ is the relative index in the associated search space sets for the CCE aggregation level L, rather than the legacy defined index $m_{s,n_{CI}}$ in the search space set configuration; and The number of candidates $M_{s,max}^{(L)\prime}$ is a sum of candidates among the associated search space sets for the CCE aggregation level L, rather than $M_{s,max}^{(L)}$ configured for each search space set.

For simplicity, supposing that two search space sets are defined in the same physical resources and configured to be associated, and for a specific aggregation level L, the number of candidates in search space set $k_0$ is $m_0$ and the number of candidates in search space set $k_1$ is $m_1$:

For search space set $k_0$, $m'_{s,n_{CI}}$=0, ..., $m_0$−1 for a serving cell;

For search space set $k_1$, $m'_{s,n_{CI}}$=$m_0$, ..., $m_0$+$m_1$−1 for a serving cell;

$M_{s,max}^{(L)\prime}$=$m_0$+$m_1$; and

Other parameters just follow the legacy.

It is contemplated that formula (2) is given for purpose of illustration and is not therefore intended to limit the scope of the present disclosure. The CCE indexes for each candidate for a CCE aggregation level in each search space set of the associated search space sets can be determined at least partially based on the relative index of the candidate or a total number of candidates for the aggregation level among the associated search space sets in other way without departing from the spirit and scope of the present disclosure.

According to some embodiments of the present disclosure, for the associated search space sets which are defined in different physical resources, the CCE indexes for each candidate for a CCE aggregation level in each search space set of the associated search space sets can be determined by formula (1).

According to some embodiments of the present disclosure, for the associated search space sets which are defined in different physical resources, the CCE indexes for each candidate for a CCE aggregation level in each search space set of the associated search space sets are determined in the same way as that defined for the associated search space sets which are defined in the same physical resources. For example, the CCE indexes for each candidate for a CCE aggregation level in each search space set of the associated search space sets can be determined by formula (2).

According to some embodiments of the present disclosure, with the scheme of associated search space sets (no matter the two or more associated search space sets are defined in the same or different physical resources), the DCI transmitted in a search space set of the associated search space sets may indicate whether there is any DCI being transmitted in another search space set of the associated search space sets. In some embodiments of the present disclosure, the DCI transmitted in each of the associated search space sets may indicate whether there is any DCI being transmitted in the rest of the associated search space sets. In some other embodiments of the present disclosure, each of the associated search space sets may be configured with a priority explicitly or implicitly (e.g., a search space set with a low search space ID or relative index may have a priority higher than that with a high search space ID or relative index, or a search space set with a low search space ID or relative index may have a priority lower than that with a high search space ID or relative index). The DCI transmitted in a high priority search space set of the associated search space sets may indicate whether there is any DCI being transmitted in a low priority search space set of the associated search space sets.

As such, when a UE detects a DCI in a search space set of the two or more associated search space sets, it may determine whether there is any DCI being transmitted in other search space set(s) of the associated search space sets based on the indication of the detected DCI, thereby determining whether it needs to detect PDCCH or DCI in other search space set(s) of the associated search space sets. With such a scheme, the PDCCH monitoring effort can be reduced since the UE can skip detection of other search space set(s) of the associated search space sets when the detected DCI indicates that no DCI is transmitted in other search space set(s) of the associated search space sets.

According to some embodiments of the present disclosure, when no DCI is detected in a search space set, the UE may go on to detect PDCCH or DCI in a next search space set. Alternatively, the UE may determine whether to detect PDCCH or DCI in other search space set(s) of the associated search space sets based on an additional configuration, which may be transmitted to the UE through at least one UE specific signaling, e.g., RRC signaling, MAC signaling, PHY signaling, or any combination thereof.

An example is given below for better understanding of the associated search space sets. It should be understood that the parameter values in the example are provided only for purpose of illustration and are not therefore intended to limit the scope of the present disclosure.

In this example, a first search space set with a search space ID $k_0$ and a second search space set with a search space ID $k_1$ are configured to be associated, wherein $k_0<k_1$. The first and second search space sets are associated with the same CORESET and configured with the same starting symbol in time domain. Accordingly, the relative index of the first search space set is 0, and the relative index of the second search space set is 1. The CORESET associated with the first and second search space sets has a size of 48 physical resource blocks (PRBs) and 2 OFDM symbols, and thus includes 16 CCEs respectively with indexes 0, 1, . . . , 15.

In this example, the first search space set is configured with 2 candidates for the CCE aggregation level (AL)=2 and 1 candidate for AL=4. The second search space set is configured with 2 candidates for AL=2 and 2 candidates for AL=4. Thus, it can be determined that: for the first search space set, the two candidates (candidate 0 and candidate 1) for AL=2 have relative indexes 0 and 1, respectively, and the candidate (candidate 0) for AL=4 has a relative index 0; for the second search space set, the two candidates (candidate 0 and candidate 1) for AL=2 have relative indexes 2 and 3, respectively, and the two candidates (candidate 0 and candidate 1) for AL=4 have relative indexes 1 and 2, respectively. The total number of candidates $M_{s,max}^{(L)'}$ counted across the associated search space sets is 4 for AL=2, and is 3 for AL=4.

Further supposing CORESET ID p=1, slot index $n_{s,f}^\mu=0$, UE ID $n_{RNTI}=128$, and carrier indicator field value $n_{CI}=0$, the CCE indexes for each candidate for each aggregation level in each search space set determined based on formula (2) are listed in the following Table 1.

TABLE 1

|  | AL = 2 | | AL = 4 | |
| --- | --- | --- | --- | --- |
|  | Candidate 0 | Candidate 1 | Candidate 0 | Candidate 1 |
| Search space set $k_0$ | (6, 7) | (10, 11) | (12, 13, 14, 15) | NA |
| Search space set $k_1$ | (14, 15) | (2, 3) | (0, 1, 2, 3) | (4, 5, 6, 7) |

The UE configured with the associated search space sets $k_0$ and $k_1$ first sequentially detects candidate 0 (i.e., CCEs 6 and 7 in the CORESET) for AL=2, candidate 1 (i.e., CCEs 10 and 11 in the CORESET) for AL=2, and candidate 0 (i.e., CCEs 12-15 in the CORESET) for AL=4 in search space set $k_0$, and then detects candidates in search space set $k_1$. If a DCI is detected in a candidate in search space set $k_0$, and the detected DCI indicates that no DCI is transmitted in search space set $k_1$, the UE will not detect candidates in search space set $k_1$ anymore, thereby reducing the PDCCH monitoring effort.

According to some embodiments of the present disclosure, to reduce the PDCCH monitoring effort, the associated search space sets may be configured with different monitoring periodicities, which may result in an adaptation of the number of candidates (full-set or sub-set) to be detected in different slots.

According to some embodiments of the present disclosure, to reduce the PDCCH monitoring effort, the associated search space sets may be configured with a smaller number of DCIs than the legacy, e.g., only one DCI format is configured for a search space set.

Figure 2:
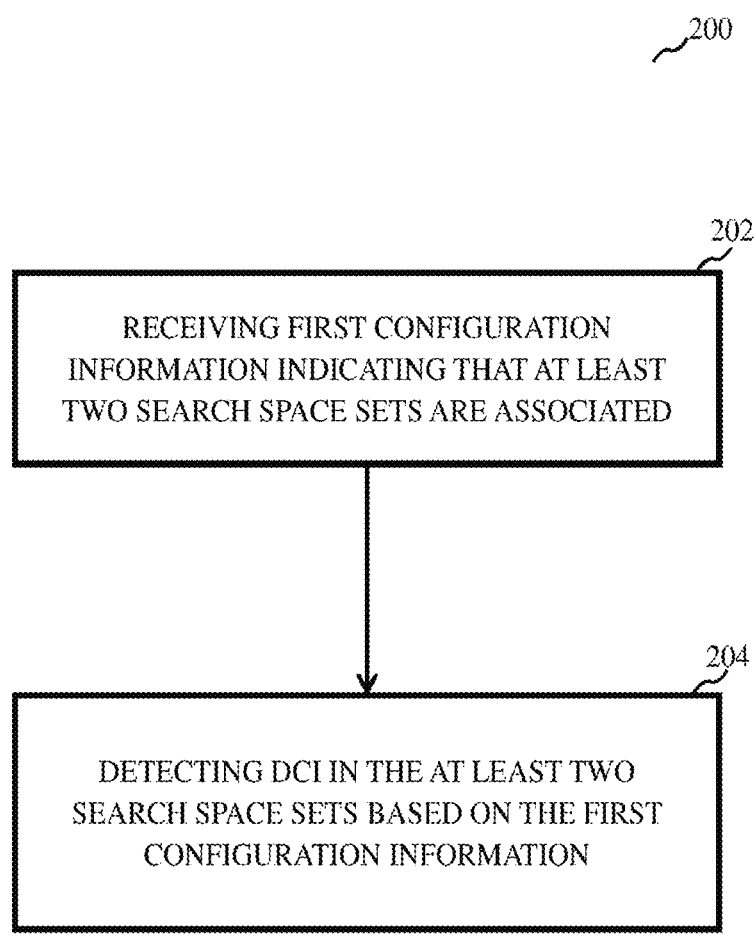
FIG. 2 illustrates an exemplary flow chart of a method for PDCCH monitoring according to some embodiments of the present disclosure.

FIG. 2 illustrates an exemplary flow chart of a method 200 for reducing PDCCH monitoring according to some embodiments of the present disclosure. The method 200 may be performed by a UE (e.g., a RedCap UE, or UE 103 in FIG. 1) or other devices having similar functionality.

As shown in FIG. 2, the UE may receive first configuration information indicating that at least two search space sets are associated in step 202. The association of the at least two search space sets can be explicitly or implicitly indicated. The first configuration information can be received through at least one UE specific signaling, e.g., RRC signaling, MAC signaling, PHY signaling, or any combination thereof. In some embodiments of the present disclosure, the at least two search space sets are UE specific search space sets. In some other embodiments of the present disclosure, the at least two search space sets may include a common search space set associated with UE specific search space set(s).

The at least two associated search space sets may be defined in the same or different physical resources. According to some embodiments of the present disclosure, each of the associated search space sets may be numbered with a relative index. The relative index of each search space set can be determined based on a search space ID of the search space set. Candidates for an aggregation level in the at least two associated search space sets are numbered jointly and sequentially according to the relative indexes of the at least two search space sets so that each candidate is numbered with a relative index. Each CCE for a candidate for an aggregation level for a search space set of the at least two search space sets may be determined at least partially based on the relative index of the candidate. Additionally or alternatively, each CCE for a candidate for an aggregation level for a search space set of the at least two search space sets may be determined at least partially based on a total number of candidates for the aggregation level among the at least two search space sets.

As shown in FIG. 2, the UE may detect DCI in the at least two search space sets based on the first configuration information in step 204. According to some embodiments of the present disclosure, when the UE detects a DCI in a first search space set, it may determine, based on the detected DCI, whether to detect DCI in a second search space set which is associated with the first search space set as indicated in the first configuration information. The first search space set may have an index lower than the second search space set. Alternatively, the first search space set may have a priority higher than the second search space set.

According to some embodiments of the present disclosure, when no DCI is detected in the first search space set, the UE may always detect DCI in the rest of the at least two associated search space sets. According to some other embodiments of the present disclosure, the UE may receive second configuration information on search space set, and when no DCI is detected in the first search space set, the UE may determine whether to detect DCI in the rest of the at least two associated search space sets based on the second configuration information. The second configuration information can be received through at least one UE specific signaling, e.g., RRC signaling, MAC signaling, PHY signaling, or any combination thereof.

Figure 3:
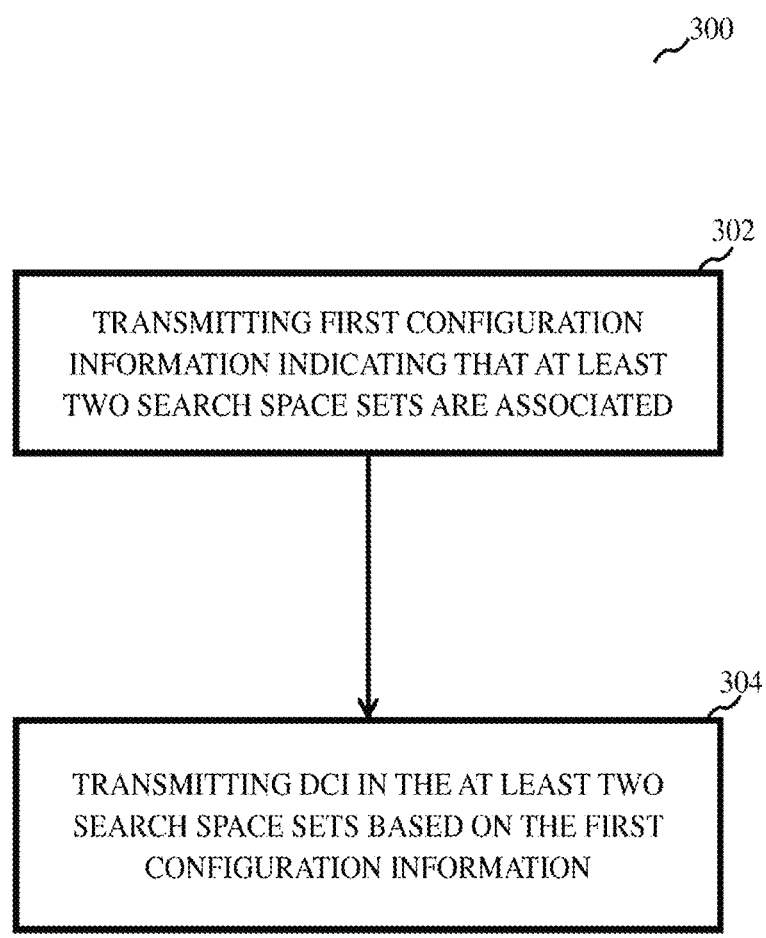
FIG. 3 illustrates an exemplary flow chart of another method for PDCCH monitoring according to some embodiments of the present disclosure.

FIG. 3 illustrates an exemplary flow chart of a method 300 for reducing PDCCH monitoring according to some embodiments of the present disclosure. The method 300 may be performed by a BS (e.g., BS 101 in FIG. 1) or other devices having similar functionality.

As shown in FIG. 3, the BS may configure at least two search space sets to be associated, and transmit first configuration information to a UE (e.g., a RedCap UE, or UE 103 in FIG. 1) indicating that at least two search space sets are associated in step 302. The association of the at least two search space sets can be explicitly or implicitly indicated. The first configuration information can be transmitted through at least one UE specific signaling, e.g., RRC signaling, MAC signaling, PHY signaling, or any combination thereof. In some embodiments of the present disclosure, the at least two search space sets are UE specific search space sets. In some other embodiments of the present disclosure, the at least two search space sets may include a common search space set associated with UE specific search space set(s).

The at least two associated search space sets may be defined in the same or different physical resources. According to some embodiments of the present disclosure, each of the associated search space sets may be numbered with a relative index. The relative index of each search space set can be determined based on a search space ID of the search space set. Candidates for an aggregation level in the at least two associated search space sets are numbered jointly and sequentially according to the relative indexes of the at least two search space sets so that each candidate is numbered with a relative index. Each CCE for a candidate for an aggregation level for a search space set of the at least two search space sets may be determined at least partially based on the relative index of the candidate. Additionally or alternatively, each CCE for a candidate for an aggregation level for a search space set of the at least two search space sets may be determined at least partially based on a total number of candidates for the aggregation level among the at least two search space sets.

As shown in FIG. 3, the BS may transmit DCI in the at least two search space sets based on the first configuration information in step 304. According to some embodiments of the present disclosure, the BS may transmit first DCI in a first search space set, and the first DCI may indicate whether second DCI is transmitted in a second search space set which is associated with the first search space set as indicated in the first configuration information. The first search space set may have an index lower than the second search space set. Alternatively, the first search space set may have a priority higher than the second search space set.

According to some embodiments of the present disclosure, the BS may transmit second configuration information on search space set to the UE, which may indicate whether the UE needs to detect DCI in the second search space set when no DCI is detected in the first search space set. The second configuration information can be transmitted through at least one UE specific signaling, e.g., RRC signaling, MAC signaling, PHY signaling, or any combination thereof.

With the methods described in the present disclosure, the PDCCH monitoring effort can be reduced to save power consumption of a UE while an enough number of candidate control channels are configured to ensure a low PDCCH blocking rate for the UE.

Figure 4:
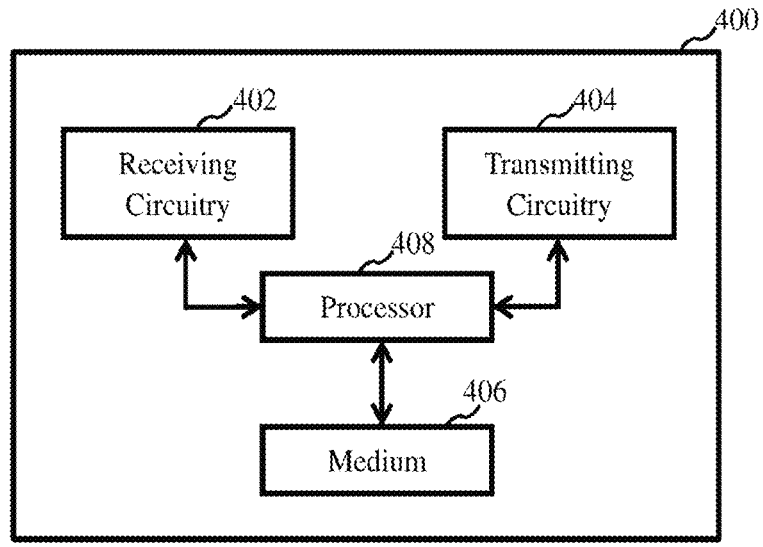
FIG. 4 illustrates an exemplary block diagram of an apparatus according to some embodiments of the present disclosure.

FIG. 4 illustrates an exemplary block diagram of an apparatus 400 according to some embodiments of the present disclosure. In some embodiments of the present disclosure, the apparatus 400 may be a UE (e.g., a RedCap UE, or UE 103 in FIG. 1) or other devices having similar functionality, which can at least perform the method illustrated in FIG. 2.

As shown in FIG. 4, the apparatus 400 may include at least one receiving circuitry 402, at least one transmitting circuitry 404, at least one non-transitory computer-readable medium 406, and at least one processor 408 coupled to the at least one receiving circuitry 402, the at least one transmitting circuitry 404, the at least one non-transitory computer-readable medium 406. While shown to be coupled to each other via the at least one processor 408 in the example of FIG. 4, the at least one receiving circuitry 402, the at least one transmitting circuitry 404, the at least one non-transitory computer-readable medium 406, and the at least one processor 408 may be coupled to one another in various arrangements. For example, the at least one receiving circuitry 402, the at least one transmitting circuitry 404, the at least one non-transitory computer-readable medium 406, and the at least one processor 408 may be coupled to each other via one or more local buses (not shown for simplicity(s).

Although in FIG. 4, elements such as receiving circuitry 402, transmitting circuitry 404, non-transitory computer-readable medium 406, and processor 408 are described in the singular, the plural is contemplated unless limitation to the singular is explicitly stated. In some embodiments of the present disclosure, the at least one receiving circuitry 402 and the at least one transmitting circuitry 404 are combined into a single device, such as a transceiver. In certain embodiments of the present disclosure, the apparatus 400 may further include an input device, a memory, and/or other components.

In some embodiments of the present disclosure, the at least one non-transitory computer-readable medium 406 may have stored thereon computer-executable instructions which are programmed to cause the at least one processor 408 to implement the steps of the methods, for example as described in view of FIG. 2, with the at least one receiving circuitry 402 and the at least one transmitting circuitry 404. For example, when executed, the instructions may cause the at least one processor 408 to receive, with the at least one receiving circuitry 402, first configuration information indicating that at least two search space sets are associated. The instructions may further cause the at least one processor 408 to detecting DCI in the at least two search space sets based on the first configuration information. To detect DCI in the at least two search space sets, the instructions may cause the at least one processor 408 to detect a first search space set of the at least two search space sets, and when first DCI is detected in the first search space set, to determine whether to detect second DCI in a second search space set of the at least two search space sets based on the first DCI.

Figure 5:
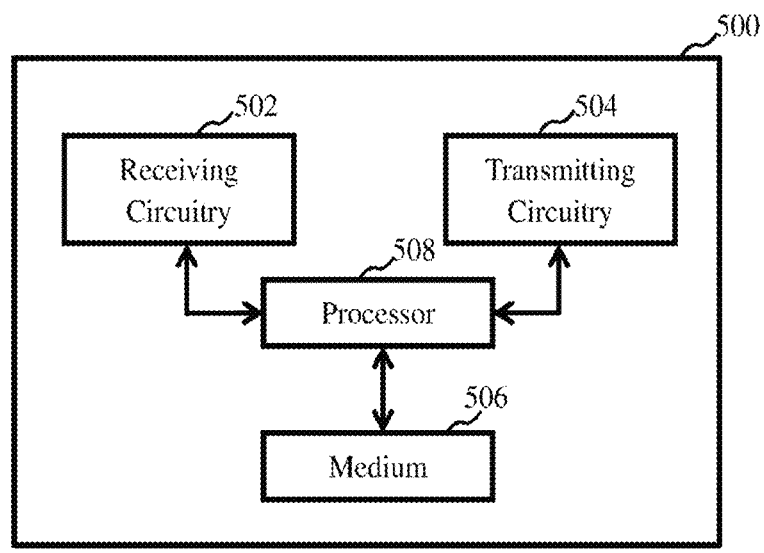
FIG. 5 illustrates an exemplary block diagram of another apparatus according to some embodiments of the present disclosure.

FIG. 5 illustrates an exemplary block diagram of an apparatus 500 according to some embodiments of the present disclosure. In some embodiments of the present disclosure, the apparatus 500 may be a BS (e.g., BS 101 in FIG. 1) or other devices having similar functionality, which can at least perform the method illustrated in FIG. 3.

As shown in FIG. 5, the apparatus 500 may include at least one receiving circuitry 502, at least one transmitting circuitry 504, at least one non-transitory computer-readable medium 506, and at least one processor 508 coupled to the at least one receiving circuitry 502, the at least one transmitting circuitry 504, the at least one non-transitory computer-readable medium 506. While shown to be coupled to each other via the at least one processor 508 in the example of FIG. 5, the at least one receiving circuitry 502, the at least one transmitting circuitry 504, the at least one non-transitory computer-readable medium 506, and the at least one processor 508 may be coupled to one another in various arrangements. For example, the at least one receiving circuitry 502, the at least one transmitting circuitry 504, the at least one non-transitory computer-readable medium 506, and the at least one processor 508 may be coupled to each other via one or more local buses (not shown for simplicity).

Although in FIG. 5, elements such as receiving circuitry 502, transmitting circuitry 504, non-transitory computer-readable medium 506, and processor 508 are described in the singular, the plural is contemplated unless limitation to the singular is explicitly stated. In some embodiments of the present disclosure, the at least one receiving circuitry 502 and the at least one transmitting circuitry 504 are combined into a single device, such as a transceiver. In certain embodiments of the present disclosure, the apparatus 500 may further include a memory and/or other components.

In some embodiments of the present disclosure, the at least one non-transitory computer-readable medium 506 may have stored thereon computer-executable instructions which are programmed to cause the at least one processor 508 to implement the steps of the methods, for example as described in view of FIG. 3, with the at least one receiving circuitry 502 and the at least one transmitting circuitry 504. For example, when executed, the instructions may cause the at least one processor 508 to transmit, with the at least one transmitting circuitry 504, first configuration information indicating that at least two search space sets are associated. The instructions may further cause the at least one processor 508 to transmit, with the at least one transmitting circuitry 504, DCI in the at least two search space sets based on the first configuration information. To transmit DCI in the at least two search space sets, the instructions may cause the at least one processor 508 to transmit, with the at least one transmitting circuitry 504, first DCI in a first search space set of the at least two search space sets, wherein the first DCI indicates whether second DCI is transmitted in a second search space set of the at least two search space sets.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. An apparatus for wireless communication, comprising:
   at least one memory; and
   at least one processor coupled to the at least one memory and configured to cause the apparatus to:
      receive configuration information indicating that at least two search space sets are associated;
      detect first downlink control information (DCI) in a first search space set of the at least two search space sets based on the configuration information; and
      determine whether to detect second DCI in a second search space set of the at least two search space sets based on the first DCI.

2. The apparatus of claim 1, wherein the at least two search space sets are associated with a same control resource set.

3. The apparatus of claim 2, wherein the at least two search space sets are configured with a same starting symbol in time domain.

4. The apparatus of claim 1, wherein each search space set of the at least two search space sets is numbered with a relative index.

5. The apparatus of claim 4, wherein the relative index of each search space set is determined based on a search space identifier of the search space set.

6. The apparatus of claim 4, wherein candidates for an aggregation level in the at least two search space sets are numbered jointly and sequentially according to the relative indexes of the at least two search space sets so that each candidate is numbered with a relative index.

7. The apparatus of claim 6, wherein each control channel element for a candidate for an aggregation level for a search space set of the at least two search space sets is determined at least partially based on the relative index of the candidate.

8. The apparatus of claim 6, wherein each control channel element for a candidate for an aggregation level for a search space set of the at least two search space sets is determined at least partially based on a total number of candidates for the aggregation level among the at least two search space sets.

9. The apparatus of claim 1, wherein the first search space set has a priority higher than the second search space set.

10. The apparatus of claim 1, wherein the first search space set has an index lower than the second search space set.

11. An apparatus for wireless communication, comprising:
at least one memory; and
at least one processor coupled to the at least one memory and configured to cause the apparatus to:
transmit first configuration information indicating that at least two search space sets are associated, wherein the at least two search space sets are associated with a same control resource set and a same starting symbol in time domain; and
transmit downlink control information (DCI) in the at least two search space sets based on the first configuration information.

12. The apparatus of claim 11, wherein the first configuration information is transmitted through at least one user equipment (UE) specific signaling.

13. The apparatus of claim 11, wherein, to transmit DCI in the at least two search space sets based on the first configuration information, the at least one processor is configured to cause the apparatus to:
transmit first DCI in a first search space set of the at least two search space sets, wherein the first DCI indicates whether second DCI is transmitted in a second search space set of the at least two search space sets.

14. An apparatus for wireless communication, comprising:
at least one memory; and
at least one processor coupled to the at least one memory and configured to cause the apparatus to:
receive configuration information indicating that at least two search space sets are associated, wherein the configuration information includes first configuration information associated with a first search space set of the at least two search space sets and second configuration information associated with a second search space set of the at least two search space sets;
detect the first search space set of the at least two search space sets based on the first configuration information; and
when no downlink control information (DCI) is detected in the first search space set, determine whether to detect DCI in the second search space set of the at least two search space sets based on the second configuration information.

15. The apparatus of claim 14, wherein each search space set of the at least two search space sets is numbered with a relative index.

16. The apparatus of claim 15, wherein the relative index of each search space set is determined based on a search space identifier of the search space set.

17. The apparatus of claim 15, wherein candidates for an aggregation level in the at least two search space sets are numbered jointly and sequentially according to the relative indexes of the at least two search space sets so that each candidate is numbered with a relative index.

18. An apparatus for wireless communication, comprising:
at least one memory; and
at least one processor coupled to the at least one memory and configured to cause the apparatus to:
transmit first configuration information indicating that at least two search space sets are associated, wherein:
each search space set of the at least two search space sets is numbered with a relative search space set index,
candidates for an aggregation level in the at least two search space sets are numbered jointly and sequentially according to the relative search space set indexes of the at least two search space sets so that each candidate is numbered with a relative candidate index, and
each control channel element for a candidate for an aggregation level for a search space set of the at least two search space sets is determined at least partially based on a total number of candidates for the aggregation level among the at least two search space sets; and
transmit downlink control information (DCI) in the at least two search space sets based on the first configuration information.

19. The apparatus of claim 18, wherein the first configuration information is transmitted through at least one user equipment (UE) specific signaling.

20. The apparatus of claim 18, wherein, to transmit DCI in the at least two search space sets based on the first configuration information, the at least one processor is configured to cause the apparatus to:
transmit first DCI in a first search space set of the at least two search space sets, wherein the first DCI indicates whether second DCI is transmitted in a second search space set of the at least two search space sets.

* * * * *